June 3, 1958  A. G. KANDOIAN  2,837,715
WIDE BAND SLOTTED LINE
Filed March 20, 1953
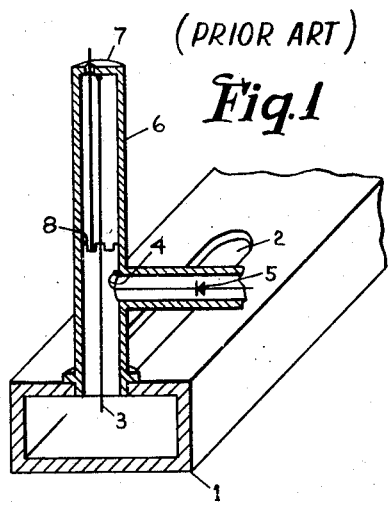
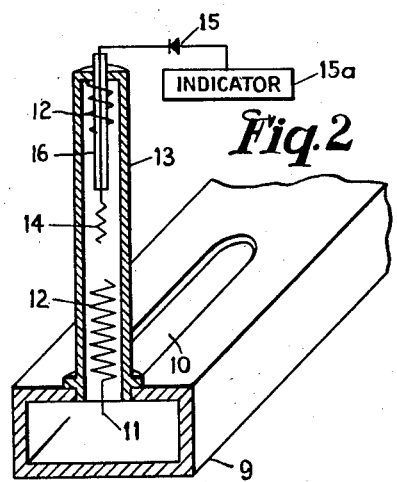
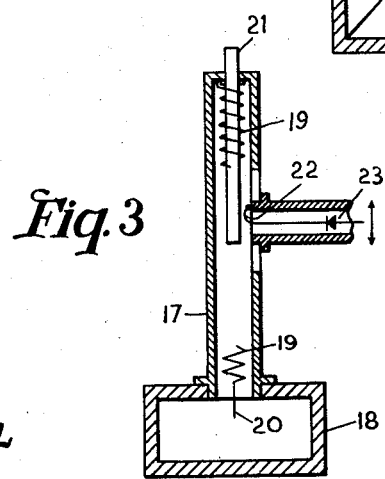
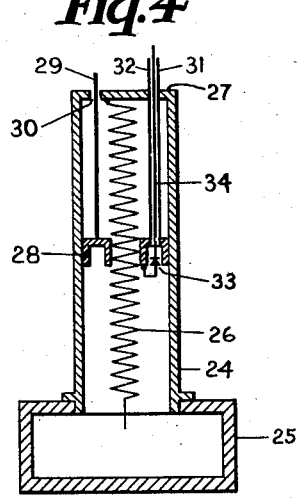
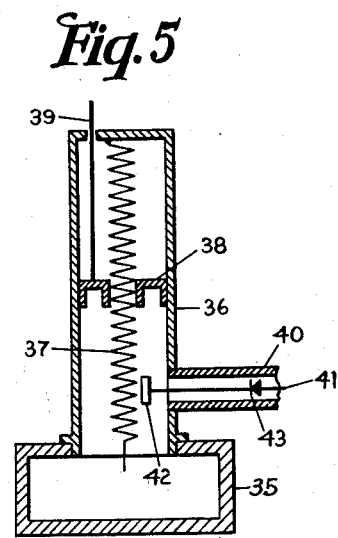
INVENTOR
ARMIG G. KANDOIAN
BY
*Ernest Fanwick*
ATTORNEY United States Patent Office 2,837,715
Patented June 3, 1958

2,837,715

WIDE BAND SLOTTED LINE

Armig G. Kandoian, Glen Rock, N. J., assignor to International Telephone and Telegraph Corporation, a corporation of Maryland Application March 20, 1953, Serial No. 343,622

14 Claims. (Cl. 324—95)

This invention relates generally to instruments for measuring the standing wave in a transmission line, and more particularly to slotted section and movable probe test equipment.

The instrument that has been most widely used for the measurement of standing waves in a microwave transmission line consists essentially of a section of transmission line or waveguide into which a small antenna, or probe, can be introduced through a slot. Such an instrument is commonly referred to as a slotted line. The probe extracts a small fraction of the power flowing in the transmission line, and couples the power to an external circuit containing a rectifier, sometimes an amplifier, and an indicating device. The power that is diverted from the slotted line by the probe and coupled through the rectifier ultimately causes a deflection of an indicating device. Due to the mismatch of the probe circuit no power is coupled out of the transmission line unless the impedance of the probe circuit is made resonant. Heretofore, cavities containing tuning stubs were utilized to adjust the resonance of the probe circuits but they had a very limited tuning range thus requiring a plurality of instruments to be used when the energy to be transmitted in the transmission line comprised a wide frequency band.

One of the objects of this invention therefore is to provide a wide range frequency tuner for slotted line test equipment. Another object of this invention is to provide slotted line test equipment utilizing a helical conductor coupled to the probe capable of being adjusted over a wide frequency range.

A further object of this invention is to provide a wide range frequency tuner for slotted line test equipment of simple construction and whose frequency range may be easily adjusted.

One of the features of this invention comprises a traveling probe having a cylindrical conductor containing a helix, one end of which constitutes the probe for a slotted section of transmission line. A shorting element is disposed coaxially of the helix to short out turns of the helix as the shorting element is adjusted. By shorting turns of the helix the effective length of the axial structure formed by the helix and the cylindrical conductor is changed causing the traveling probe to achieve a condition of resonance over a wide band of frequencies. The power picked up by the probe is coupled to a rectifier whose output is connected to an indicating device to measure the standing wave in the transmission line.

The above-mentioned and other features and objects of this invention will become more apparent by reference to the following description taken in conjunction with the accompanying drawings, in which:

Fig. 1 is a perspective view partly in cross section of a prior art slotted line measuring device;

Fig. 2 is a perspective view partly in cross section of one embodiment of a slotted line measuring device according to the principles of this invention utilizing inductive coupling;

Fig. 3 is a cross-sectional view of an alternate embodiment of this invention utilizing a loop coupling;

Fig. 4 is a cross-sectional view of a further embodiment of this invention utilizing direct coupling; and Fig. 5 is a cross-sectional view of another embodiment of this invention utilizing capacitive coupling.

Referring to Fig. 1, the prior art slotted line shown therein, comprises a section of waveguide transmission line 1 having a slot 2, cut therein, running parallel to the lines of surface current flow associated with the electromagnetic field propagated in the transmission line 1. A small antenna or probe 3 is inserted into the transmission line or waveguide 1 through the slot 2 and extracts a small fraction of the power flowing in the transmission line. The probe 3 is mounted so that it can traverse the length of the slot 2. It is well-known that the presence of the slot 2 modifies the propagated electromagnetic field configuration only to a minor extent. In a rectangular waveguide carrying the dominant mode ($TE_{1\ 0}$) the slot 2 must be located at the center of either of the two broad walls of the guide. The length of the slot must be long enough to permit observation of at least one maximum and one minimum, as the probe 3 traverses the length of the slot, regardless of the position of the standing wave pattern relative to the slot 2. A considerably longer slot is advantageous since the observation of several maxima and minima affords a useful check on the instrument and allows a more accurate determination of the wave length in the slotted section.

A coupling loop 4 is provided at a current maximum point to pick up energy coupled from the transmission line 1 by the probe 3. The energy picked up by the loop 4 is coupled through a rectifier 5 to an indicator device (not shown) such as a meter or an oscilloscope. It is apparent that if the probe 3 presents a mismatch to the circuit no power will be coupled out of the transmission line 1. Thus a resonant section 6 is provided. One end of the probe is coupled to the closed end 7 of the resonant section 6 and an adjustable shorting device 8 is provided to tune the section to a condition of resonance.

In general, when frequency measurements are to be made at one frequency the shorting device 8 can be adjusted to provide a condition of resonance, and if the frequency is varied slightly from the original frequency the section 6 could be tuned to provide resonance for any slight frequency variation. However, when measurements are required to be made over a relatively wide frequency band great difficulty is encountered in tuning the section 6 over the required range.

Referring to Fig. 2, a wide range frequency tuner for a slotted line in accordance with the principles of this invention, is shown, comprising a slotted section of waveguide transmission line 9 having a longitudinal slot 10 cut therein through which a probe 11 is inserted to divert a portion of the energy from the slotted line. The probe 11 is a continuation of a helix 12 having its other end coupled to one wall of a cylindrical conductor 13. A loop 14 centered axially of the helix inductively couples energy from the helix to a rectifier device 15 whose output is connected to an indicator 15a. A shorting rod 16 is movably mounted in the end wall of the cylindrical conductor 13 and has an outside diameter equal to the inside diameter of the helix 12. As the shorting rod 16 is moved into the helix 12 successive turns of the helix are shorted to the outer conductive element 13 thus changing the effective length of the coaxial structure formed by the helix 12 and the outer conductive element or cylindrical conductor 13. Due to the great length of an inner conductor formed in the shape of helix 12 a tuning range of approximately 1:20 is obtained, thus enabling the slotted line measuring device of this invention to be used over an extremely wide frequency band. In order to obtain a maximum coupling relation between loop 14 and helix 12 the loop 14 can be rotated.

Referring to Fig. 3 an alternate embodiment of the measuring device of this invention is shown comprising an outer conductive element 17 which is coupled to a slotted section of transmission line 18. An inner conductive element 19 in the form of a helix coaxial with the outer conductive element 17 has one end 20 inserted through the slot into transmission line 18 to form a probe. A shorting rod 21 is provided to short out successive turns of the helix 19 to bring the coaxial structure formed by the outer conductive element 17 and the helix 19 into a condition of resonance. A coupling loop 22 is provided at a current maximum point to pick up energy coupled from the transmission line 18 by the probe 20 and helical conductor 19. The energy picked up by coupling loop 22 is coupled to a rectifier 23 in the usual manner. The coupling loop 22 may be constructed in such a manner that it be made adjusted to insure maximum efficiency by always being located at a maximum current point along the helical conductor 19.

Referring to Fig. 4 another alternate embodiment of the wide range frequency tuner of this invention is shown comprising an outer conductive element 24 coupled to the slotted line section 25. An inner conductive helical element 26 has one end connected to the closed end 27 of the outer conductive element 24 and its other end inserted through the slot into waveguide 25 to form a probe. An annular cup 28 has its inner diameter equal to the outer diameter of helix 26 and its outer diameter equal to the inner diameter of the outer conductive element 24. A rod 29 is inserted through an opening 30 in the closed end 27 and coupled to the annular cup 28. Axial movement of the rod 29 causes the cup 28 to short out more or less turns of the helix 26 thus varying the length of the resonant structure formed by the inner and outer conductive elements. An output coaxial cable 31 has its outer conductor 32 slidably connected to the outer conductive element 24 and directly connected to cup 28. A detector 33 is inserted in series with the inner conductor 34 and the annular cup 28.

Signal currents responsive to the standing waves in waveguide 25 are induced in the helix 26 and are rectified in detector 33 to provide signal demodulation currents corresponding to the standing waves. These currents are coupled to an indicator device.

Referring to Fig. 5 a device for measuring the standing waves in a waveguide transmission system in accordance with the principles of this invention is shown comprising a slotted line 35, a resonant section having an outer conductive element 36 and an inner conductive element 37 in the form of a helix. Wide band frequency tuning is accomplished in a manner similar to the device shown in Fig. 4 by using an annular cup 38 moved by a rod 39 to short out more or less turns of the helix 37. An output coaxial cable has its outer conductor 40 coupled to outer conductive element 36 and its inner conductor 41 coupled to a capacitive coupler 42 which is located at a voltage maximum point (i. e. high impedance). A detector 43 is coupled in series with the inner conductor 41 to provide signal demodulation currents, responsive to the standing waves picked up by the probe of the inner conductive element 37, which are coupled to an indicating device.

While I have described above the principles of my invention in connection with specific apparatus, it is to be clearly understood that this description is made only by way of example and not as a limitation to the scope of my invention as set forth in the objects thereof and in the accompanying claims.

I claim:

1. A device for measuring the standing waves in a transmission line having energy propagated therethrough comprising a resonant section including an outer conductive element and an inner conductive element in the form of a helix, non-frequency sensitive direct electrical contacting means for shorting turns of said helix to vary the resonant frequency of said resonant section, coupling means extending from the end of said helical element into said transmission line for introducing energy from said transmission line into said resonant section in accordance with the standing waves existing in said line and means for coupling energy from said resonant section.

2. A device for measuring the standing waves in a microwave transmission line having energy propagated therethrough comprising a coaxial resonant section including a hollow outer conductive element and an inner helical conductive element, said helix having a constant pitch and being entirely disposed within said hollow outer conductor, means for shorting out more or less turns of said helical element to cause said section to resonate by varying the effective length of said coaxial resonant section, coupling means extending from the end of said helical element into said transmission line for diverting a part of said propagated energy from said transmission line into said section in accordance with the standing waves in said transmission line and means for coupling energy from said section.

3. A device for measuring the standing waves in a waveguide transmission line having energy propagated therethrough and having a slot in one wall thereof parallel to the lines of surface current flow associated with the electromagnetic field propagated in said waveguide comprising a resonant section including a hollow outer conductive element and an inner conductive element in the form of a helix having a constant pitch and said helix being entirely disposed within said hollow outer conductive element and coaxial with said outer conductive element one end of said helix extending through said slot into said waveguide to divert a portion of said propagated energy from said waveguide into section section, non-frequency sensitive direct electrical contacting means for shorting out turns of said helix to said outer conductor to cause said section to resonate at various frequencies by varying the effective length of the coaxial structure formed by said outer conductor and said helix, and means for coupling energy from said section.

4. A device according to claim 3 wherein said means for shorting out turns of said helix includes a rod having an outer diameter substantially equal to the inner diameter of said helix and means to move said rod coaxially of said helix whereby successive turns of said helix are shorted to said rod.

5. A device according to claim 3 wherein said means for shorting out turns of said helix includes an annular cup coaxial with said helix having an outer diameter substantially equal to the inside diameter of said outer conductive element and an inside diameter substantially equal to the outside diameter of said helix whereby said cup will short out turns of said helix by coupling turns to said outer conductive element.

6. A device according to claim 3 wherein said means for coupling energy from said section includes an inductive coupling loop located at a high current point of said helix.

7. A device according to claim 3 wherein said means for coupling energy from said section includes a capacitive coupling device located at a high impedance point of said helix.

8. A device according to claim 3 wherein said means for coupling energy from said section includes a coaxial cable having an inner and outer conductor, means to couple said outer conductor to said outer conductive element, a detector, means to couple said detector between said inner conductor and said helix.

9. A device according to claim 3 wherein said means for coupling energy from said section includes a coaxial cable having an inner and outer conductor, means to couple said outer conductor to said outer conductive element, a coupling loop, means to connect said inner conductor to said coupling loop and means to locate said coupling loop coaxially of said helix.

10. A device according to claim 9 which further includes means to rotate said coupling loop to obtain the optimum coupling relationship between said coupling loop and said helix.

11. A device for measuring the standing waves in a waveguide transmission line having energy propagated therethrough and having a slot in one wall thereof parallel to the lines of surface current flow associated with the electromagnetic field propagated in said waveguide comprising a resonant section including a hollow outer conductive element and an inner conductive element in the form of a helix coaxial with said outer conductive element, one end of said helix extending through said slot into said waveguide to divert a portion of said propagated energy from said waveguide into said section, means supporting said probe for movement along the length of said slot, a rod having an outer diameter substantially equal to the inner diameter of said helix, means disposing said rod for movement axially of said helix to short out successive turns of said helix, means to couple said outer conductive element to said rod, a coupling coil, means to locate said coupling coil coaxially of said helix, an output coaxial cable having an inner and outer conductor, means to couple said outer conductor to said outer conductive element, a detector, means to couple said detector to said coupling coil, and means to couple said inner conductor to said detector.

12. A device for measuring the standing waves in a waveguide transmission line having energy propagated therethrough and having a slot in one wall thereof parallel to the lines of surface current flow associated with the electromagnetic field propagated in said waveguide comprising a resonant section including a hollow outer conductive element and an inner conductive element in the form of a helix coaxial with said outer conductive element one end of said helix extending through said slot into said waveguide to divert a portion of said propagated energy from said waveguide into said section, a means supporting said probe for movement along the length of said slot, a rod having an outer diameter substantially equal to the inner diameter of said helix, means disposing said rod for movement axially of said helix to short out successive turns of said helix, a detector to rectify signal currents, means to couple one side of said detector to said helix at a high current point, an output coaxial cable having inner and outer conductors, means to couple the other side of said detector to said inner conductor and means to couple said outer conductor to said outer conductive element.

13. A device for measuring the standing waves in a waveguide transmission line having energy propagated therethrough and having a slot in one wall thereof parallel to the lines of surface current flow associated with the electromagnetic field propagated in said waveguide comprising a resonant section including a hollow outer conductive element and an inner conductive element in the form of a helix coaxial with said outer conductive element, one end of said helix extending through said slot into said waveguide to divert a portion of said propagated energy from said waveguide into said section, means supporting said probe for movement along the length of said slot, an annular cup coaxial with said helix having an outside diameter substantially equal to the inside diameter of said outer conductive element and an inside diameter substantially equal to the outside diameter of said helix whereby said cup will short out turns of said helix by coupling said helix to said outer conductive element, a detector to rectify signal currents, means to couple one side of said detector to said annular cup, an output coaxial cable having inner and outer conductors, means to couple the other side of said detector to said inner conductor and means to couple said outer conductor to said outer conductive element.

14. A device for measuring the standing waves in a waveguide transmission line having energy propagated therethrough and having a slot in one wall thereof parallel to the lines of surface current flow associated with the electromagnetic field propagated in said waveguide comprising a resonant section including a hollow outer conductive element and an inner conductive element in the form of a helix having a constant pitch coaxial with and entirely disposed within said outer conductive element, one end of said helix extending through said slot into said waveguide to divert a portion of said propagated energy from said waveguide into said section, means supporting said probe for movement along the length of said slot, an annular cup coaxial with said helix having an outside diameter substantially equal to the inside diameter of said outer conductive element and an inside diameter substantially equal to the outside diameter of said helix whereby said cup short circuits turns of said helix by making direct electrical contact and coupling said helix to said outer conductive element, means to capacitively couple energy from said helix at a voltage maximum point, a detector to rectify signal currents, means to couple one side of said detector to said capacitive coupler, an output coaxial cable having inner and outer conductors, means to couple the other side of said detector to said inner conductor and means to couple said outer conductor to said outer conductive element.

References Cited in the file of this patent

UNITED STATES PATENTS

| | | |
|---|---|---|
| 2,516,169 | Wong | July 25, 1950 |
| 2,567,748 | White | Sept. 11, 1951 |
| 2,611,088 | Harvey | Sept. 16, 1952 |
| 2,641,708 | Carlson | June 9, 1953 |
| 2,659,817 | Cutler | Nov. 17, 1953 |